(12) United States Patent
Torres et al.

(10) Patent No.: US 7,890,444 B2
(45) Date of Patent: Feb. 15, 2011

(54) VISUALIZATION OF DATA AVAILABILITY AND RISK

(75) Inventors: Robert J. Torres, Colleyville, TX (US); James R. Rudd, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 11/857,714

(22) Filed: Sep. 19, 2007

(65) Prior Publication Data

US 2009/0076991 A1 Mar. 19, 2009

(51) Int. Cl.
*G06N 5/00* (2006.01)
(52) U.S. Cl. ...................................................... 706/45
(58) Field of Classification Search ...................... 706/45
See application file for complete search history.

(56) References Cited

U.S. PATENT DOCUMENTS

| | | | |
|---|---|---|---|
| 5,699,403 A | 12/1997 | Ronner | |
| 6,684,213 B1 | 1/2004 | Schell et al. | |
| 7,130,779 B2 | 10/2006 | Beverina et al. | |
| 2003/0101087 A1 | 5/2003 | Walker et al. | |
| 2004/0249679 A1 | 12/2004 | Henderson et al. | |

OTHER PUBLICATIONS

Barzi et al ("Imputations of Missing Values in Practice: Results from Imputations of Serum Cholesterol in 28 Cohort Studies" 2004 ).*
Sulo et al ("DaVis: A tool for Visualizing Data Quality" 2005).*
Pang et al ("Approaches to Uncertainty Visualization" Sep. 1996).*

\* cited by examiner

*Primary Examiner*—Michael B. Holmes
*Assistant Examiner*—Lut Wong
(74) *Attorney, Agent, or Firm*—Yee & Associates, P.C.; William H. Steinberg; Rudolf O. Siegesmund

(57) ABSTRACT

The advanced data availability tool uses predictive analysis to fill gaps in a data set and then displays actual data, predicted data, and confidence intervals for the actual data and the predicted data. The advanced data availability tool has a data collection tool, a data table created by the data collection tool, a data table analyzer, a predicted data table, and an enhanced data display.

9 Claims, 4 Drawing Sheets

VISUALIZATION OF DATA AVAILABILITY AND RISK

FIELD OF THE INVENTION

The invention relates generally to computer data processing, and particularly to displaying quantitative search information with metric displays.

BACKGROUND OF THE INVENTION

Business leaders and managers deal with risk in a variety of forms. One form of risk involves making decisions on less than complete information. Since real world decisions seldom involve complete information, business leaders and managers often make decisions with incomplete data and little or no knowledge about the risk that the missing data creates. In such cases, business personnel make intuitive or "gut level" assessments.

One area in which business leaders and managers make decisions based upon incomplete data involves computer generated metric displays. Computer generated metric displays depend on periodically updated input data to provide meaningful and valid indicators. Such input data is based on historical data. For example, a company providing computer services might use a graph of server traffic over time to determine when to add or decrease capacity. A manufacturing company may compare final yield of a product to determine the impact of a variable on a particular process at different time intervals. But not all historical data is available for input when needed.

Input data can be incomplete because data is missing or because a time lag occurs between when an event takes place, and when the known effects of the event are determined. Incomplete input data impacts the computer generated metric display and therefore, the ability of the business leader or manager to use the metric to analyze risk. In either case, a gap in the data of the computer generated metric affects the quality of the decision based upon the metric.

Capabilities exist for analyzing historical performance data and using the historical performance data to predict missing data points. Therefore, a need exists to integrate predictive capabilities directly into business metrics for the purpose of providing a metric with actual and predicted data.

SUMMARY OF THE INVENTION

The advanced data availability tool uses predictive analysis to fill gaps in a data set and then displays actual data, predicted data, and confidence intervals for the actual data and the predicted data. The advanced data availability tool has a data collection tool, a data table created by the data collection tool, a data table analyzer, a predicted data table, and an enhanced data display.

The data collection tool and the data table created by the data collection tool are based on existing art. The data collection tool populates the data table with historical data. The data table analyzer accesses the historical data within the data table and determines whether there are gaps in the data.

The data table analyzer uses known predictive analysis algorithms to generate predicted values for missing data in the gaps based on historical performance, actual data points immediately surrounding a gap, and local trends. The data table analyzer determines statistical confidence intervals based on the actual data and also based on a combination of the actual data and the predicted data, and saves the actual data, the predicted data, and the confidence intervals to the predicted data table.

The enhanced display program displays the actual data, the predicted data, and confidence intervals.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "advanced data availability tool."

Figure 1:
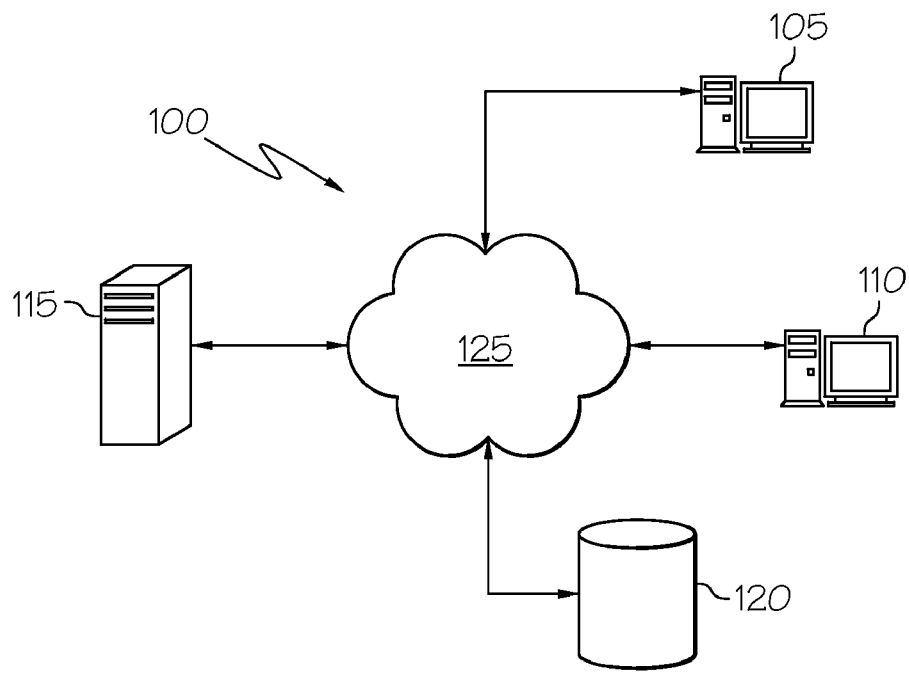
FIG. 1 depicts an exemplary computer network.

Additionally, the advanced data availability tool is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
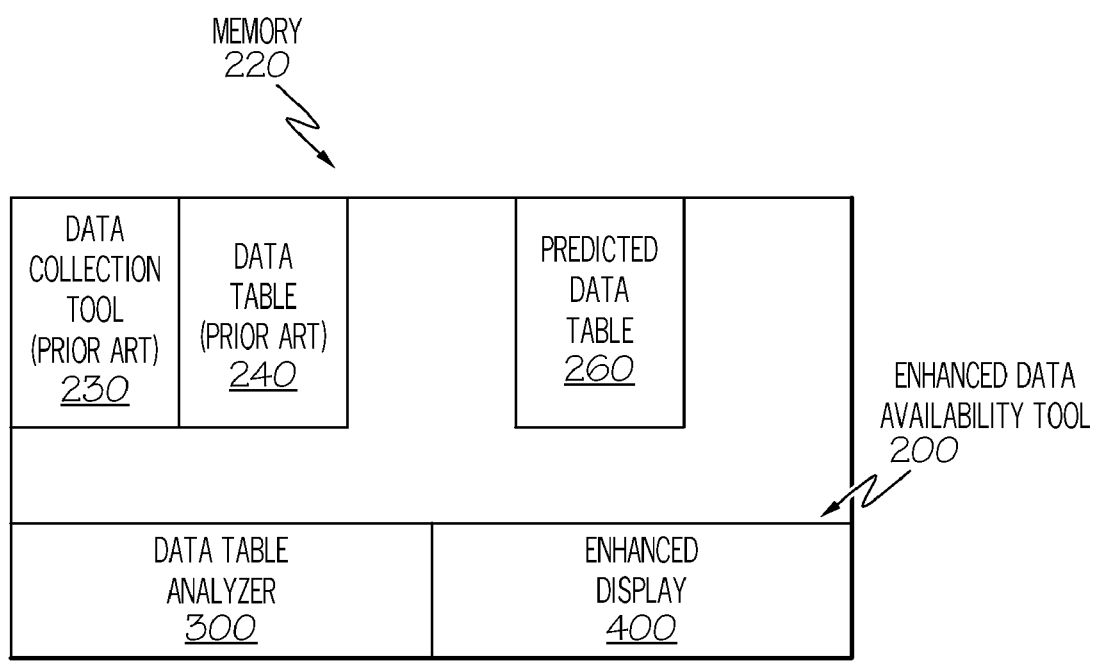
FIG. 2 depicts an exemplary memory containing components of the advanced data availability tool.

Advanced data availability tool 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. FIG. 2 is included merely as a descriptive expedient and does not necessarily reflect any particular physical embodiment of memory 220. Memory 220 contains prior art data collection tool 230, prior art data table 240, and predicted data table 260. Memory 220 further contains enhanced data availability tool 200 comprising data table analyzer 300 and enhanced display 400.

Figure 3:
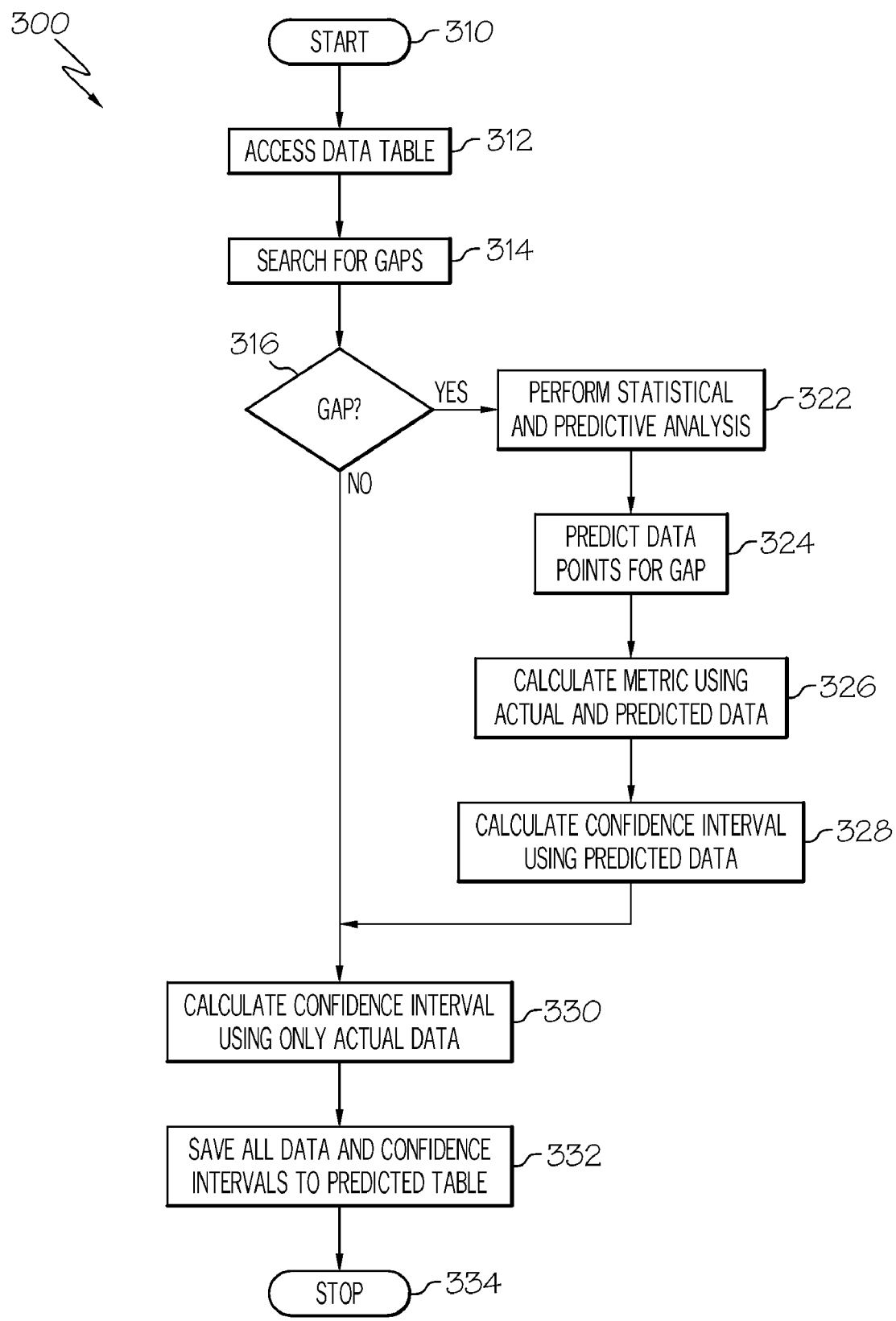
FIG. 3 depicts a flow chart of the data availability analyzer program.

FIG. 3 depicts the logic of data table analyzer 300. Data table analyzer starts when called by advanced data tool 200 (310) and accesses data table 240 (312). Data table analyzer 300 analyzes the data in data table 240 searching for gaps in the data (314). When data table analyzer 300 determines that a gap exists in the data (316), it performs predictive analysis of the data in data table 240 (322) and generates predictive data points for the gap (324). Next, data table analyzer 300 calculates a metric using both the actual and the predicted data (326), and then calculates a confidence interval using the predicted data (328). It then calculates a confidence interval using only actual data (330). Finally, it saves the data from data table 240, the newly generated predictive data, and the confidence intervals to predicted table 260 (332) and stops (334). When data table analyzer 300 determines that there are no data gaps, it calculates a confidence interval using only actual data and then saves the data from data table 240, and the confidence interval to predicted table 260.

Figure 4:
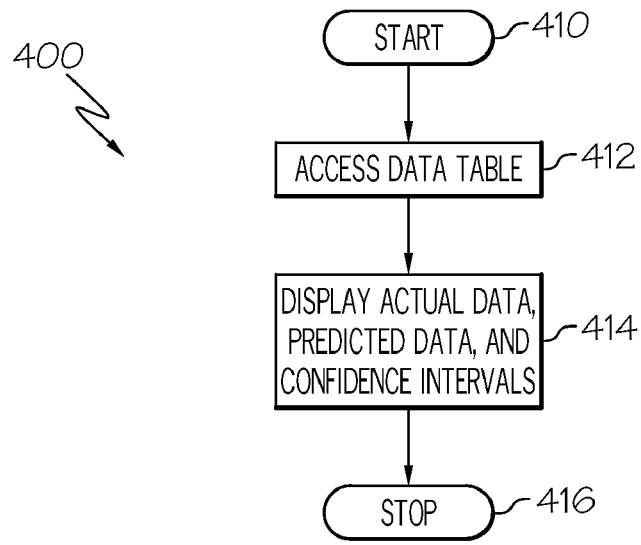
FIG. 4 depicts a flow chart of the enhanced display program.

FIG. 4 depicts a flowchart of the logic of enhanced display 400. Enhanced display 400 starts when called by advanced data tool 200 (410) and accesses predicted data table 240 (412). Enhanced display 400 then displays the actual data, the predicted data, and the confidence intervals (414) and stops (416).

Figure 5:
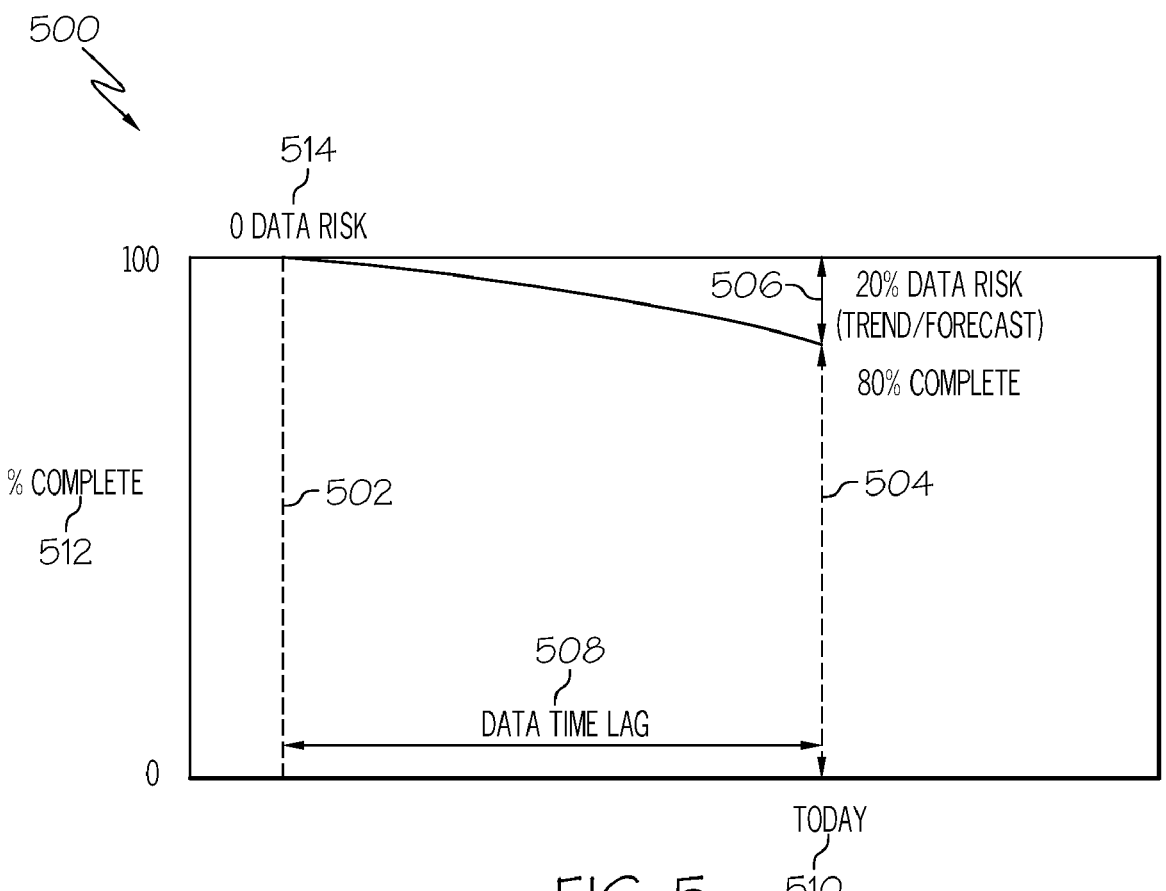
FIG. 5 depicts a first exemplary display.

FIG. 5 depicts first exemplary display 500 having a vertical axis showing percent complete 512 and a horizontal time axis indicating present day 510. First exemplary display 500 shows data risk percentage 506 for incomplete data in relation to complete data percentage 504 at present day 510. First exemplary display 500 shows that data is 80% complete due to data time lag 508.

Figure 6:
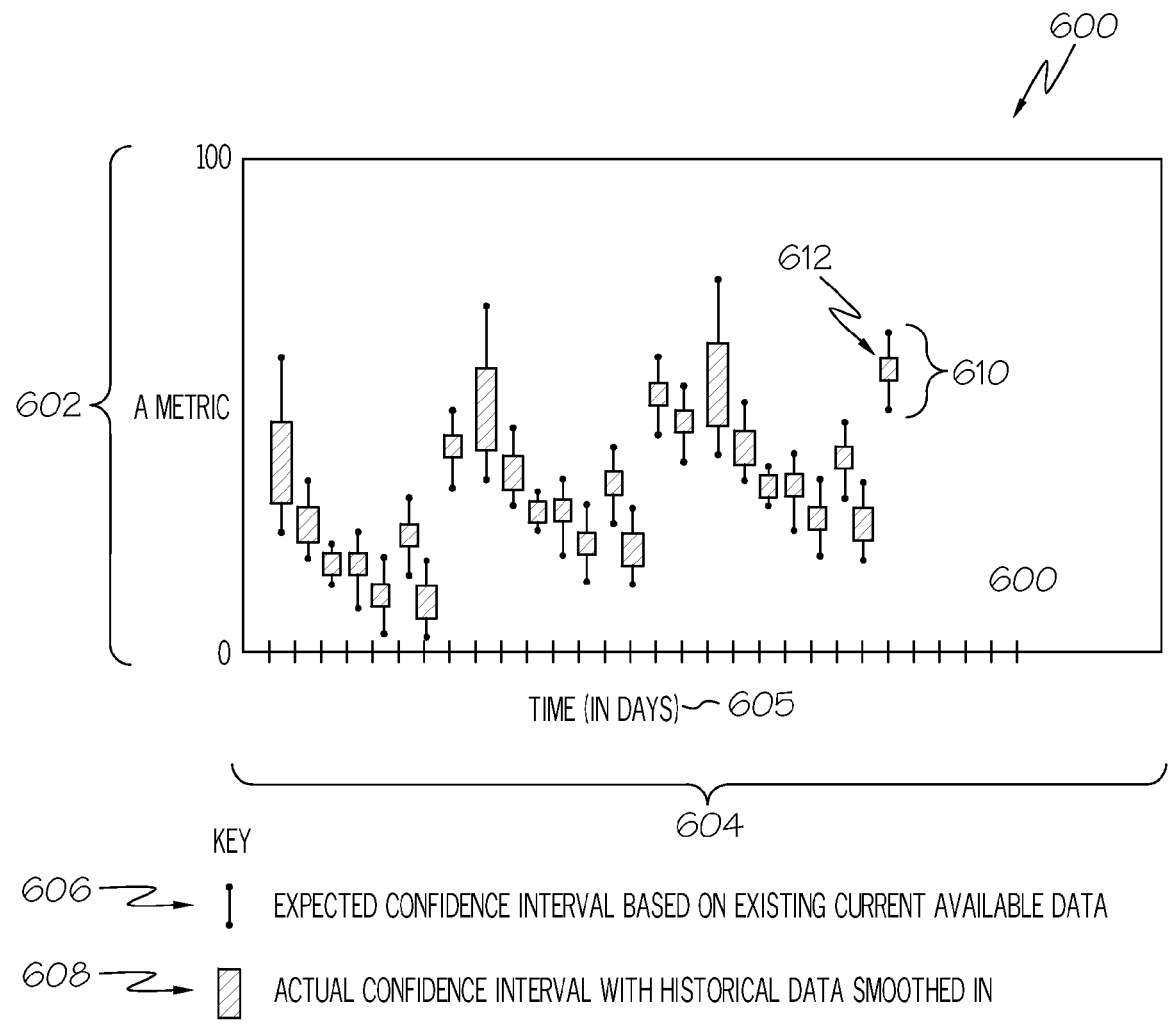
FIG. 6 depicts a second exemplary display.

FIG. 6 depicts second exemplary display 600 having a vertical axis 602 indicating a metric and horizontal axis 604 showing a time in days 605. First key 606 indicates expected confidence interval based on existing current available data. Second key 608 shows actual confidence interval with historical data smoothed in.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A method comprising:
   accessing, by a processor, a data table containing a plurality of actual data;
   analyzing, by the processor, the data table to determine if there is a gap in the plurality of actual data;
   responsive to a determination that there is a gap, performing, by the processor, a predictive analysis on the plurality of actual data;
   generating, from the predictive analysis, a predicted data for the gap;
   calculating, by the processor, a metric using the plurality of actual data and the predicted data;
   calculating, by the processor, a first confidence interval using only the predicted data;
   calculating, by the processor, a second confidence interval using only the plurality of actual data;
   saving the predicted data, the first confidence interval and the second confidence interval to a predicted data table; and
   displaying the actual data, the predicted data, the first confidence interval and the second confidence interval.

2. The method of claim 1 further comprising:
   displaying a graph plotting a metric versus time and plotting a first key and a second key, wherein the first key indicates an expected confidence interval based on an existing current available data and the second key indicates an actual confidence including a plurality of historical data, and wherein the second key is superimposed over the first key.

3. The method of claim 1 further comprising:
   displaying a graph indicating a data risk percentage for a plurality of incomplete data in relation to a complete data percentage due to a time lag.

4. A system comprising:
   a computer having at least one processor connected to a computer readable memory, a non transitory computer readable storage device, and a display;
   first program instructions for accessing a data table containing a plurality of actual data;
   second program instructions for analyzing the data table to determine if there is a gap in the plurality of actual data;
   third program instructions for performing, responsive to determining that there is a gap in the plurality of actual data, a predictive analysis on the plurality of actual data;
   fourth program instructions for generating a predicted data for the gap;
   fifth program instructions for calculating a metric using the plurality of actual data and the predicted data;
   sixth program instructions for calculating a first confidence interval using only the predicted data;
   seventh program instructions for calculating a second confidence interval using only the plurality of actual data;
   eighth program instructions for saving the predicted data, the first confidence interval and the second confidence interval to a predicted data table; and
   ninth program instructions for displaying the actual data, the predicted data, the first confidence interval and the second confidence interval on the display;
   wherein the first through the ninth program instructions are stored in the non-transitory computer readable storage device for execution by a processor via the computer readable memory.

5. The system of claim 2 further comprising:
   tenth program instructions for displaying a graph plotting a metric versus time and plotting a first key and a second key, wherein the first key indicates an expected confidence interval based on an existing current available data and the second key indicates an actual confidence including a plurality of historical data, and wherein the second key is superimposed over the first key;
   wherein the first through the ninth program instructions are stored in the computer readable storage device for execution by a processor via the computer readable memory.

6. The system of claim 2 further comprising:
   eleventh program instructions for displaying a graph indicating a data risk percentage for a plurality of incomplete data in relation to a complete data percentage due to a time lag;
   wherein the first through the ninth program instructions are stored in the computer readable storage device for execution by a processor via the computer readable memory.

7. A computer program product comprising:
a non transitory computer readable storage device;
first program instructions to access a data table containing a plurality of actual data;
second program instructions to analyze the data table to determine if there is a gap in the plurality of actual data;
third instructions to perform, responsive to a determination that there is a gap in the plurality of actual data, a predictive analysis on the plurality of actual data;
fourth program instructions to generate a predicted data for the gap;
fifth program instructions to calculate a metric using the plurality of actual data and the predicted data;
sixth program instructions to calculate a first confidence interval using only the predicted data;
seventh program instructions to calculate a second confidence interval using only the plurality of actual data;
eighth program instructions to save the predicted data, the first confidence interval and the second confidence interval to a predicted data table; and
ninth program instructions to display the actual data, the predicted data, the first confidence interval and the second confidence interval;
wherein the first through the ninth program instructions are stored in the non transitory computer readable storage device.

8. The computer program product of claim 7 further comprising:
tenth program instructions for displaying a graph plotting a metric versus time and plotting a first key and a second key, wherein the first key indicates an expected confidence interval based on an existing current available data and the second key indicates an actual confidence including a plurality of historical data, and wherein the second key is superimposed over the first key;
wherein the eleventh program instructions are stored in the computer readable storage device.

9. The computer program product of claim 7 further comprising:
eleventh program instructions for displaying a graph indicating a data risk percentage for a plurality of incomplete data in relation to a complete data percentage due to a time lag;
wherein the eleventh program instructions are stored in the computer readable storage device.

* * * * *